United States Patent
Stanzel et al.

(10) Patent No.: US 7,260,320 B2
(45) Date of Patent: Aug. 21, 2007

(54) ELECTRIC HEAT TRACING

(75) Inventors: Erwin Stanzel, Linsengericht (DE); Dieter Spornitz, Frankfurt am Main (DE)

(73) Assignee: Tyco Thermal Controls, Inc., Redwood City, CA (US)

( * ) Notice: Subject to any disclaimer, the term of this patent is extended or adjusted under 35 U.S.C. 154(b) by 0 days.

(21) Appl. No.: 10/545,942

(22) PCT Filed: Feb. 17, 2004

(86) PCT No.: PCT/GB2004/000622

§ 371 (c)(1),
(2), (4) Date: Dec. 12, 2005

(87) PCT Pub. No.: WO2004/073354

PCT Pub. Date: Aug. 26, 2004

(65) Prior Publication Data

US 2006/0115246 A1    Jun. 1, 2006

(30) Foreign Application Priority Data

Feb. 17, 2003  (GB) .................................. 0303630.8

(51) Int. Cl.
*E03B 7/10* (2006.01)

(52) U.S. Cl. ...................................... 392/468; 392/465

(58) Field of Classification Search ..................... None
See application file for complete search history.

(56) References Cited

U.S. PATENT DOCUMENTS

| | | | |
|---|---|---|---|
| 3,398,262 A | * | 8/1968 | Kahn ........................ 392/468 |
| 3,971,416 A | * | 7/1976 | Johnson ........................ 138/33 |
| 3,975,617 A | * | 8/1976 | Othmer ........................ 392/469 |
| 4,031,611 A | * | 6/1977 | Johnson, Jr. .................. 29/611 |
| 4,152,577 A |   | 5/1979 | Leavines |
| 4,312,121 A |   | 1/1982 | Tweed |
| 4,314,144 A | * | 2/1982 | Wojtecki et al. ............ 219/528 |
| 4,346,277 A | * | 8/1982 | Wojtecki et al. ............ 219/528 |
| 4,401,156 A | * | 8/1983 | Wojtecki et al. ............ 165/172 |
| 4,575,617 A |   | 3/1986 | Cooper |
| 5,294,780 A |   | 3/1994 | Montierth et al. |
| 6,810,916 B2 | * | 11/2004 | Thompson .................... 138/32 |

* cited by examiner

*Primary Examiner*—Thor S. Campbell
(74) *Attorney, Agent, or Firm*—Wyatt B. Pratt; Tyco Thermal Controls, LLC

(57) ABSTRACT

Heat tracing of an elongate, thermally-insulated substrate is effected by means of one or more elongate, constant wattage electric heaters mounted in thermal contact therewith beneath the thermal insulation. A metal conduit is mounted on the substrate and extends away therefrom out through the thermal insulation. The or each heater extends from the substrate through the conduit and is connected to a source of electric power within an external junction box. By this arrangement, the heat developed along the length of the constant wattage heater as it passes through the thermal insulation of the substrate can be dissipated safely through the body of the conductive conduit.

13 Claims, 1 Drawing Sheet

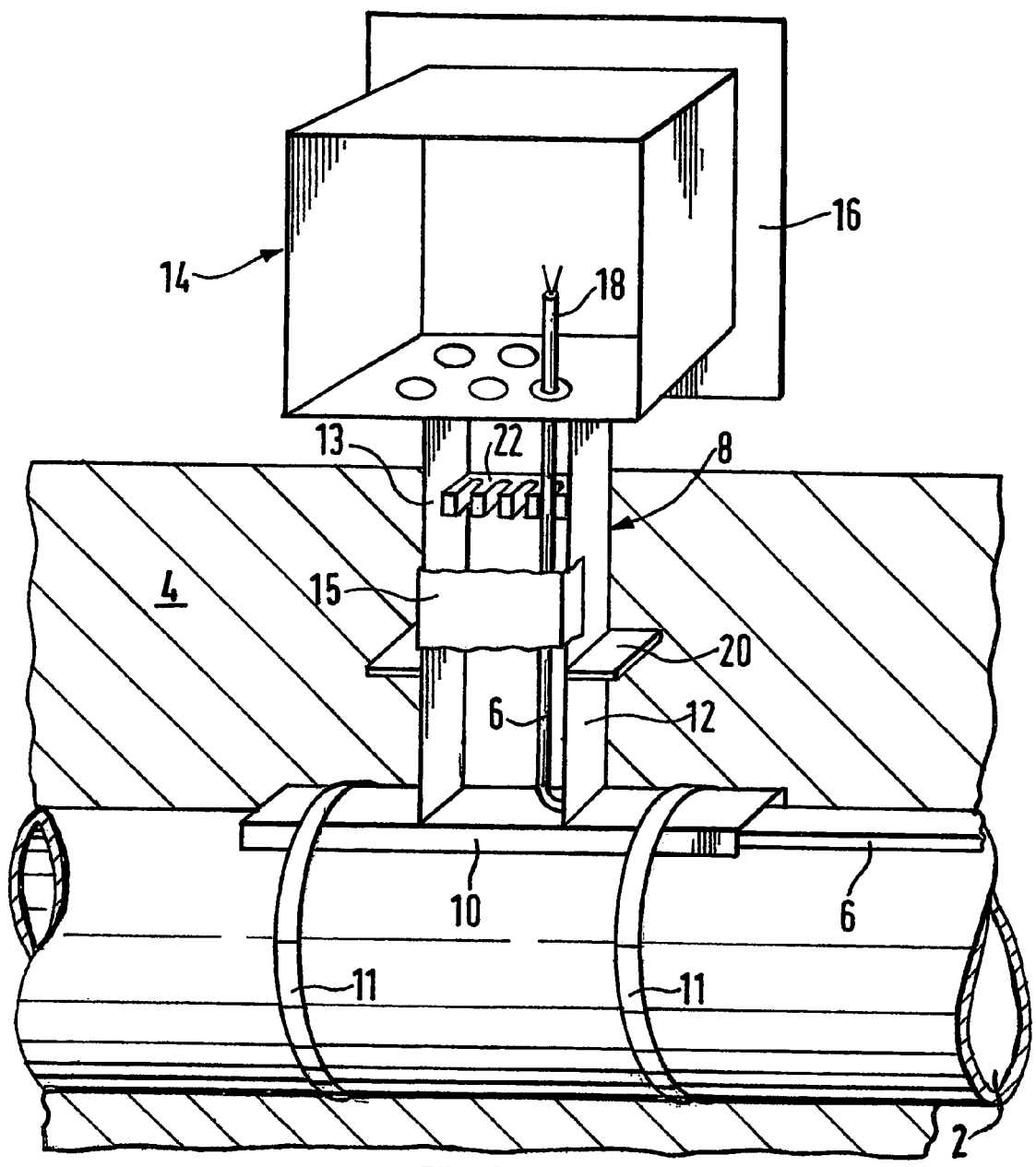
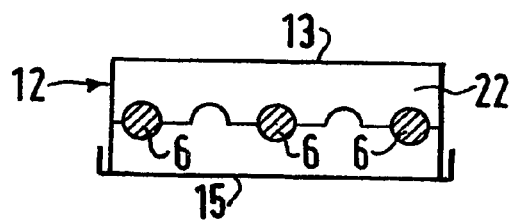
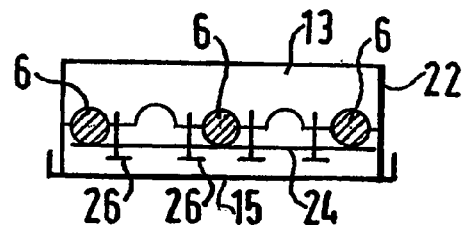

ELECTRIC HEAT TRACING

This invention relates to an arrangement for and a method of heat tracing a substrate with an electric heater.

It is known to provide heat to substrates by means of self-regulating heaters or constant wattage heaters. The substrates may be of any required form, for example planar, for use as heating pads, or as sections of roads, driveways, aircraft runways or helipads that need to be kept free of ice. A large category of heat-traced substrates, however, are of tubular form, for example being pipes for conveying water, petroleum products, or foodstuffs used in the processing industries, for example, that need to be maintained above a predetermined temperature. The heat tracing of elongate pipework is usually carried out by elongate, tape heaters that may be traced along the pipework either in a linear manner or wound therearound. A substrate that is required to be heat traced in order to maintain its temperature above ambient temperature will usually also be enclosed within thermal insulation, with the heating element in contact with the substrate beneath the insulation.

When a substrate is heat traced by means of a self-regulating heater, the significant characteristic of the heater, namely its ability to adjust its thermal output, automatically and locally, so as to maintain a substantially constant temperature, not only allows the heater to be crossed over itself, but also avoids the need for any special precautions in terms of dissipating heat therefrom to avoid burning out of the heater as its environment changes. Self regulating heaters, therefore, may safely be mounted along and/or around an insulated substrate, and may pass out through the insulation to a junction box where they may be connected directly to a source of electrical power. Constant wattage heaters, on the other hand, do not have the self regulating ability, so that when they are mounted on a substrate extra care has to be taken to ensure that the heat dissipation is such that these heaters do not overheat and thus burn out, since the amount of heat output per unit length is not automatically or locally controllable. In practice, this means that the environment of a constant wattage heater has to be considered in more detail when determining the installation, than is the case with a self-regulating heater. Thus, the power rating of a constant wattage heater is selected in accordance with the required temperature to be maintained, the substrate to be heated, and any thermal insulation provided therearound. However, except for a lower powered heater, i.e. one supplying less than about 5 watts per metre, this will inevitably mean that should the constant wattage heater then be directed away from the substrate, which acts as a heat sink, and usually out through the thermal insulation, the temperature of the heater itself would rise to an unacceptable level and cause damage thereto. In order to avoid this, it is usual for a constant wattage electric heater to be connected to an electric power cable within the thermal insulation of the substrate, so that it is the power cable and not the heater cable that is directed out of the thermal insulation and to a source of electrical power. It has been found however, that connecting these so called "cold leads" to a constant wattage heating cable is very craft-sensitive and consequently becomes the weakest point in the heating system. In an alternative arrangement, excessive heating can be avoided by using two or more relatively low powered heaters, none of which becomes too hot, but which in combination can provide the required heating of the substrate. This is, however, a more complicated arrangement.

It is one object of the present invention to provide an arrangement for and method of heat tracing a substrate using a constant wattage electric heater that overcomes, or at least alleviates, the above-mentioned disadvantages.

In accordance with one aspect of the present invention, there is provided an arrangement for heat tracing a substrate, the arrangement comprising a constant wattage electric heater, preferably of elongate form, and formed as a mineral insulated or polymer insulated cable, for example, wherein the heater is suitable for being mounted in thermal contact with the substrate to effect heating thereof, and a thermally conductive conduit that is arranged to enclose an end portion of the heater and to direct it away from the substrate, to allow the constant wattage heater to be connected directly to a source of electrical power.

Although in its broadest aspect, the substrate of the invention, acting as a heat sink, may not be thermally insulated, it usually will be enclosed within thermal insulation. In the latter case, the conductive conduit will then be arranged to enclose the end portion of the electric heater and to direct it away from the substrate and out through its insulation.

Electrical connection to the power source, outside the thermal insulation of the substrate, may conveniently be made in a junction box, for example made of polymeric material or of metal.

With such an arrangement, there is no need to provide for connection of a cold lead to the constant wattage heater at the substrate, e.g. within the substrate insulation, but on the contrary the heater can be guided therefrom to, for example, a junction box that is located outside the insulation whereby the heater may be connected directly to a source of electrical power, e.g. via a terminal block to a power cable. The increased temperature of the heater in the location away from the heat sink of the substrate can thus be controlled to a safe level by means of the thermal dissipation provided by the enclosing conductive conduit. Transfer of heat away from the heater to the conduit may be enhanced by ensuring good thermal contact therebetween.

Advantageously, the conductive conduit, and/or the junction box, may be provided with additional surfaces extending away therefrom, and in particular, though not exclusively, where the conductive conduit passes through thermal insulation of the substrate, so as further to enhance heat dissipation from the constant wattage heater.

The arrangement may comprise two or more of the elongate constant wattage heaters, with each heater enclosed within and directed through the conductive conduit away from the thermally insulated substrate, the heaters being secured and spaced apart from each other within the conduit by one or more spacer brackets. The spacer brackets may be made of metal, ceramic or of a high temperature-resistant, high thermally-conductive polymeric material.

In accordance with a further aspect of the present invention, there is provided a method of heat tracing a substrate, wherein a constant wattage electric heater is mounted in thermal contact with the substrate to effect heating thereof, wherein a conductive conduit is mounted on the substrate so as to extend away therefrom, and wherein one end of the heater is directed through the conduit and connected to a supply of electric power away from the substrate.

The substrate may be thermally insulated with the heater mounted thereon beneath the insulation, and the heater may be guided away from the substrate in the conduit as the conduit passes out through the thermal insulation.

The heat tracing method of the present invention preferably employs the arrangement in accordance with said one aspect thereof.

The term "constant wattage heater" is to be understood as including a single or multi-conductor serial heater or a parallel heater such as a zone heater.

Heat tracing arrangements and methods, each in accordance with the present invention, will now be described, by way of example, with reference to the accompanying drawings, in which:

FIG. 1 schematically illustrates one heat tracing arrangement mounted on a substrate;

FIG. 2 shows schematically a plan view of the clamping spacer of the arrangement of FIG. 1; and FIG. 3 shows a modification of the clamping spacer of the arrangement of FIG. 1.

Referring to FIG. 1, an elongate cylindrical pipe 2 carries a fluid that is required to be maintained at a specified temperature, which is above the ambient temperature. Pipe 2 is fully enclosed within an insulating layer 4, which may be of rockwool or fibreglass, for example. A constant wattage electric heating cable 6 is traced along the outer surface of the pipe 2, its power rating being selected so as to maintain the contents of the pipe 2 at the required temperature taking into account its environment, including the insulating layer 4.

A metal conduit 8 of generally rectangular configuration has a three-sided base portion 10 extending along a short length of the pipe 2 and secured thereto by straps 11. An upstanding portion 12 of the conduit 8 extends away from the base portion 10 and passes out through the pipe insulation 4. The upstanding portion 12 terminates beyond the insulation 4 in a polymeric junction box 14, which is supported thereon. An enlarged-area metal plate 16 is welded to one surface of the box 14.

The upstanding portion 12 of the conduit 8 is provided in two parts, comprising a three-sided trunking 13 that is closed by a clip-on cover 15 that may be secured in place after the heater 6 has been placed in position.

Where the heat tracing of the heater 6 comes to an end and needs to be connected to a source of electrical power, it is directed as shown into the base portion 10 and then through the upstanding portion 12 of the conduit 8 so as to emerge at its end 18 within the junction box 14. Although not shown, the heater cable end 18 is connected to a source of electrical power within the box 14 such that a constant wattage input is supplied thereto.

With the arrangement of FIG. 1, the heater 6 along the major portion of its length is in thermal contact with the pipe 2 and is thus providing the required heating thereof at a constant level along its length. It will be appreciated that the heating of the cable 6 from the source of electrical power will also take place as the cable 6 departs from the pipe 2, extends through the pipe insulation layer 4 and into the junction box 14. The provision of the thermally conductive conduit 8 serves to dissipate the heat from this portion of the cable 6, in the absence of the heat sink provided by the pipe 2, and can thus be arranged to avoid overheating, and thus potentially damaging burnout, of this portion of the cable 6, whilst allowing it to be connected directly to the source of electrical power within the junction box 14.

Heat dissipation from the junction box 14 is enhanced by the enlarged metal plate 16 secured thereto. However, it is envisaged that it may be possible to use metal in place of a polymeric material for the junction box 14 if the heat dissipation from the heater 6 within the box 14 is insufficient. In the latter case, the additional plate 16 of the box 14 may be dispensed with.

To enhance further thermal dissipation from the heater 6 as it passes through the conduit 8, the upstanding portion 12 thereof may be provided with one or more laterally-extending thermally conductive, preferably metal, fins 20, particularly in the region where the conduit portion 12 passes through the pipe insulation layer 4. However, fins 20 may also be provided on the conduit 8 outside any thermal insulation of the pipe 2.

As shown in FIG. 1, the heating of the pipe 2 is effected by means of a single constant wattage heater 6. However, it is also envisaged that a plurality of heaters may be required and will thus be required to be directed through the conduit 8 to the junction box 14. In order to avoid contact between the plurality of heaters 6 as they pass through the conduit 8, one or more spacer brackets 22 may be mounted in the upstanding portion 12 and also in the base portion 10 (not shown) thereof so as to secure the heaters 6. As indicated in FIG. 1, each heater 6 may be push-fitted into a respective recess of the bracket 22, and may emerge through its respective aperture into the junction box 14.

The spacer brackets 22 may be made of metal or of a high temperature-resistant polymer, for example.

In an alternative arrangement, the conduit 8 may be recessed along its entire length for retention of one or more heaters 6.

FIG. 2 shows a section through the upstanding portion 12 of the conduit 8 with three heating cables 6 secured therein.

FIG. 3 shows a modification of the clamping spacer bracket arrangement, in which a pressure plate 24 is provided across the front of the bracket 22 and secured thereto by means of screws 26, so as more positively to retain the heaters 6.

The invention claimed is:

1. An arrangement for heat tracing a substrate, comprising an elongate constant wattage electric heater suitable for being mounted in thermal contact with the substrate to effect heating thereof, and a thermally conductive conduit arranged to enclose the heater and to direct the heater away from the substrate to a junction box for electrical connection to be made to the heater for the supply of power thereto, wherein the substrate is enclosed within thermal insulation and the heater is arranged to be mounted on the substrate beneath the insulation, wherein the conduit is arranged to enclose the heater and to direct the heater away from the substrate out through the thermal insulation, and wherein the conductive conduit has one or more thermally conductive surfaces extending therefrom in a region between the substrate and the junction box.

2. An arrangement according to claim 1, wherein the one or more thermally conductive surfaces extend from the conductive conduit in the region where the conductive conduit passes through the thermal insulation of the substrate.

3. An arrangement according to claim 1, wherein the junction box is made of polymeric material.

4. An arrangement according to claim 1, wherein the junction box is thermally conductive.

5. An arrangement according to claim 4, wherein the junction box is formed from metal.

6. An arrangement according to claim 1, wherein the junction box is mounted in thermal contact with a thermally conductive plate, thereby to assist in the transfer of heat from the junction box.

7. An arrangement according to claim 1, wherein the elongate constant wattage heater comprises two or more of said elongate constant wattage heaters, wherein each of said heaters is enclosed within and directed through the conductive conduit, the heaters being secured spaced apart from each other within the conduit by one or more spacer brackets.

8. An arrangement according to claim 7, wherein the or each spacer bracket is made of metal, ceramic or of high temperature-resistant, high thermally conductive polymeric material.

9. An arrangement according to claim 1, wherein the one or more thermally conductive surfaces extend from the conductive conduit in a region between the thermal insulation and the junction box.

10. A method of heat tracing a thermally-insulated substrate, comprising the steps of mounting an elongate constant wattage electric heater in thermal contact with the substrate to effect heating thereof, mounting a conductive conduit on the substrate so as to extend away therefrom out through the insulation to a junction box, directing the heater through the conduit and away from the substrate, and connecting the heater to a supply of electric power, wherein the conduit has one or more thermally conductive surfaces extending therefrom in a region between the substrate and the junction box.

11. A method according to claim 10, wherein two or more constant wattage electric heaters are applied to the substrate and guided therefrom through the conductive conduit, the heaters being secured spaced apart from each other within the conduit by one or more spacer brackets.

12. A method according to claim 10, wherein the one or more thermally conductive surfaces extend from the conduit in a region between the insulation and the junction box.

13. A method of heat tracing a substrate employing the arrangement recited in claim 1.

* * * * *